United States Patent [19]
Kawano et al.

[11] 3,716,643
[45] Feb. 13, 1973

[54] ANTIMICROBIALLY ACTIVE SUBSTANCES AND THEIR PRODUCTION

[75] Inventors: Toshihiko Kawano, Kyoto; Takashi Yamaoka, Kusatsu; Keiichi Maruo, Yasuhisa Furutaka, both of Osaka, all of Japan

[73] Assignee: Daikin Kogyo Company Limited, Osaki-Fu, Japan

[22] Filed: May 1, 1970

[21] Appl. No.: 33,598

[52] U.S. Cl. .................................424/286, 260/438.1
[51] Int. Cl. ...............................................A01n 9/12
[58] Field of Search ............260/438.1, 429 K, 429 J; 424/286

[56] References Cited

UNITED STATES PATENTS

| | | | |
|---|---|---|---|
| R23,742 | 11/1953 | Hester | 424/286 |
| 2,845,453 | 7/1958 | Brooks | 260/429 K |
| 2,855,418 | 10/1958 | Mugnier | 260/429 |
| 2,900,293 | 8/1959 | Nash | 260/438.1 X |
| 2,944,073 | 7/1960 | Vesterman et al. | 260/438.1 |
| 3,037,041 | 5/1962 | Couillaud | 260/438.1 |
| 3,210,394 | 10/1965 | Nemec et al. | 260/438.1 X |
| 3,379,610 | 4/1968 | Lyon | 260/438.1 X |
| 3,401,182 | 9/1968 | Harvey et al. | 260/438.1 X |

FOREIGN PATENTS OR APPLICATIONS

| | | | |
|---|---|---|---|
| 1,174,844 | 12/1969 | Great Britain | 260/429 K |
| 1,107,568 | 3/1968 | Great Britain | 260/438.1 |
| 1,866 | 0/1961 | Japan | |
| 2,173 | 0/1954 | Japan | |

OTHER PUBLICATIONS

Chemical Abstracts, Vol. 52, pg. 20863d (1958)
Chemical Abstracts, Vol. 64, pg. 8481e (1966)
Chemical Abstracts, Vol. 65, pg. 13962b (1966)

*Primary Examiner*—H. Sneed
*Attorney*—Craig, Antonelli, Stewart & Hill

[57] ABSTRACT

Process for preparing antimicrobially active substances which comprises reacting alkylenebis(dithiocarbamic acid) in a salt form with a water-soluble divalent copper salt in the presence of a halogen ion under the condition that more than one molar amount of divalent copper ion to one molar amount of alkylenebis(dithiocarbamate) salt is present in the reaction system and, if desired, under the oxidative condition; optionally followed by subjecting the resulting product to oxidation. The obtained substances are advantageous in showing a stronger antimicrobial activity against a wide variety of phytopathogenic fungi and bacteria than known cupric alkylenebis(dithiocarbamate) does.

20 Claims, 6 Drawing Figures

ANTIMICROBIALLY ACTIVE SUBSTANCES AND THEIR PRODUCTION

The present invention relates to antimicrobially active substances and their production. More particularly, it relates to the reaction products of salts of alkylenebis(dithiocarbamic acid) with divalent copper salts in the presence of a halogen ion and their oxidation products, and their production.

Alkylenebis(dithiocarbamic acid) is presently represented by the chemical formula:

wherein A is an alkylene group. As understood from this chemical formula, it is a dibasic acid. With respect to the treatment of such alkylenebis(dithiocarbamic acid) in a salt form with copper salts, it has heretofore been considered that the use of a monovalent copper salt gives the salt consisting of alkylenebis(dithiocarbamate) ion and copper ion in a molar ratio of 1 : 2 or the salt consisting of alkylenebis(dithiocarbamate) ion and copper ion in a molar ratio of 1 : more than 2 depending on the employed amount of the monovalent copper salt, whereas the use of a divalent copper salt affords only the salt consisting of alkylenebis(dithiocarbamate) ion and copper ion in a molar ratio of 1 : 1 irrespective of the employed amount of the divalent copper salt. The above consideration comes from the following facts: (1) the reaction of disodium alkylenebis(dithiocarbamate) with an excess amount of cuprous chloride gives the salt consisting of alkylenebis(dithiocarbamate) ion and copper ion in an approximate molar ratio of 1 : 4 [Japanese Pat. Publication No. 1866/1961]; (2) the reaction of disodium alkylenebis(dithiocarbamate) with an excess amount of cupric sulfate affords the salt consisting of alkylenebis(dithiocarbamate) ion and copper ion in an approximate molar ratio of 1 : 1 [Japanese Pat. Publication No. 2173/54]. The production of the salt consisting of alkylenebis(dithiocarbamate) ion and copper ion in a molar ratio of 1 : more than 1 from alkylenebis(dithiocarbamic acid) in a salt form and a cupric salt has never been reported.

It has now been found that the treatment of alkylenebis(dithiocarbamic acid) in a salt form with a water-soluble divalent copper salt in the presence of a halogen ion under the condition that more than one molar amount of divalent copper ion to one molar amount of alkylenebis(dithiocarbamate) salt is present in the reaction system affords a novel reaction product having alkylenebis(dithiocarbamate) moiety, divalent copper atom and halogen atom, these being chemically bonded, in a molar ratio of 1 : X : Y wherein X and Y are respectively satisfying the following relationships: $1 < X \leq 3$ and $0 < Y \leq 2$. Thus, the reaction product is characteristic in containing copper atom in a higher rate than that in the one as heretofore obtained by the use of a divalent copper salt such as cupric sulfate (i.e. cupric alkylenebis(dithiocarbamate)) and having halogen atom which is substantially not present in the latter. In addition, the reaction product gives two characteristic absorption maxima around 1580 and 1420 $cm^{-1}$ in the infrared absorption spectrum, such characteristic absorptions being not seen in known cupric alkylenebis(dithiocarbamate). Moreover, it is highly appreciable that the reaction product exhibits a strong antimicrobial activity against a wide variety of phytopathogenic fungi and bacteria. For instance, the minimum inhibitory concentrations of the reaction product against Piricularia oryzae and Cochliobolus miyabeanus are much lower than those of cupric alkylenebis(dithiocarbamate).

Although the copper and halogen contents in the reaction product are varied with the molar ratios of copper and halogen ions to alkylenebis(dithiocarbamate) ion in the reaction system and the reaction conditions, the molar ratio of alkylenebis(dithiocarbamate) moiety, divalent copper atom and halogen atom in the reaction product is always 1 : X : Y wherein X and Y satisfy respectively the relationships: $1 < X \leq 3$ and $0 < Y \leq 2$. Moreover, the reaction product has commonly the said three characteristics, i.e. (1) possession of copper and halogen atoms in the molecule, (2) presentation of two infrared absorption maxima around 1580 and 1420 $cm^{-1}$ and (3) exertion of high antimicrobial activity.

As noted above, the product from the reaction of alkylenebis(dithiocarbamic acid) in a salt form with a divalent copper salt in the presence of a halogen ion under the condition that more than one molar amount of divalent copper ion to one molar amount of alkylenebis(dithiocarbamate) salt is present in the reaction system has a strong antimicrobial activity and is per se useful as an antimicrobial agent. It has, however, been found that the antimicrobial activity against some kinds of phytopathogenic fungi and bacteria can be increased by oxidizing the above reaction product. For instance, the execution of the said reaction under an oxidative condition or the treatment of the said reaction product under an oxidation condition affords the oxidation product, which is decreased in the copper content but has a somewhat higher antimicrobial activity with a reduced plant injury in comparison with the original reaction product.

Accordingly, the basic object of the present invention is to provide the substance having alkylenebis(dithiocarbamate) moiety, copper atom and halogen atom, these being chemically bonded in a molar ratio of 1 : X : Y wherein X and Y are respectively a number satisfying the relationship: $1 < X \leq 3$ and a number satisfying the relationship: $0 < Y \leq 2$ [hereinafter referred to as "Product (I)"] and its oxidation product [hereinafter referred to as "Product (II)"].

For preparation of the Product (I), alkylenebis(dithiocarbamic acid) in a salt form is reacted with a water-soluble divalent copper salt in the presence of a halogen ion under the condition that more than one molar amount of divalent copper ion to one molar amount of alkylenebis(dithiocarbamate) salt is present in the reaction system.

Examples of the salt of alkylenebis(dithiocarbamic acid) include sodium salt, potassium salt, zinc salt, manganese salt, copper salt, ammonium salt, dimethylamine salt and diethylamine salt of lower alkylenebis(dithiocarbamic acid) such as methylenebis(dithiocarbamic acid), ethylenebis(dithiocarbamic acid), propylenebis(dithiocarbamic acid), tetramethylenebis(dithiocarbamic acid) or hexamethylenebis(dithiocarbamic acid). Among them, disodium lower alkylenebis(dithiocarbamate) (particularly disodium ethylenebis(dithiocarbamate)) is preferred because of its availability at a low cost.

As the water-soluble divalent copper salt, there may be exemplified cupric chloride, cupric bromide, cupric sulfate, cupric nitrate, etc. Examples of the source for a halogen ion are cupric chloride, cupric bromide, sodium chloride, potassium chloride, ammonium chloride, sodium bromide, potassium bromide, sodium iodide, potassium iodide, zinc chloride, manganese chloride, hydrogen chloride, hydrogen bromide, hydrogen iodide, etc. As understood from the exemplifications, cupric halide is served not only as the copper source but also as the halogen source and, in case of using the same as the reagent, any other source for a halogen ion is not required to use.

Although the amount of the source for a halogen ion is not limitative, it is favored for the production of the Product (I) having a relatively strong antimicrobial activity to use in such an amount as can provide more than 0.1 molar amount, preferably 0.3 to 2.0 molar amount of a halogen ion to one molar amount of alkylenebis(dithiocarbamate) salt in the reaction system.

In carrying out the reaction, it is essential to establish such a condition that more than one molar amount of divalent copper ion to one molar amount of alkylenebis(dithiocarbamate) salt is present in the reaction system. In case of using cupric alkylenebis(dithiocarbamate), the employment of the water-soluble divalent copper salt in any small amount will realize such condition. On the other hand, the use of a salt of alkylenebis(dithiocarbamic acid) other than the cupric salt will require the employment of the water-soluble divalent copper salt in more than 1.0 molar amount to one molar amount of the salt of alkylenebis(dithiocarbamic acid). Although any higher amount than the said lower limitation may be employed, 3 molar amount of divalent copper ion is the highest to be combined with one molar amount of alkylenebis(dithiocarbamate) salt according to the present invention. Therefore, the use of the water-soluble divalent copper salt in much excess is of no advantage. In general, the preferred condition is to be present more than 1.1 molar amount, particularly 1.3 to 3.0 molar amount of divalent copper ion to one molar amount of alkylenebis(dithiocarbamate) salt in the reaction system.

The reaction is normally effected in water, a water-miscible organic solvent or their mixture. Examples of the organic solvent are methanol, ethanol, etc. From the practical viewpoint, the use of water is favored.

The temperature for reaction may be from 10° to 100° C, preferably from 30° to 80° C.

Since the Product (I) is substantially insoluble in water or a water-miscible organic solvent such as methanol or ethanol, its recovery from the reaction mixture can be readily accomplished, for instance, by simply filtrating.

The contents of the copper and halogen atoms in the Product (I) are varied with the temperature and time for reaction, the concentrations and molar ratio of alkylenebis(dithiocarbamate) ion, divalent copper ion and halogen ion, and the like.

For preparation of the Product (II), the Product (I) may be subjected to oxidation. The oxidation is carried out in a per se conventional procedure, for instance, by treating the Product (I) with an oxidizing agent such as chlorine, bromine, chlorinated lime, oxygen, air, hydrogen peroxide or ozone in a medium such as water, a water-miscible organic solvent or their mixture, usually at a temperature from 10° to 100° C (favorably from 30° to 80° C). In this treatment, the maintenance of the reaction system under an acidic condition, for instance, with a mineral acid such as hydrochloric acid is favored for producing the Product (II) in a higher yield.

Alternatively, the Product (II) may be produced in a single step, i.e. by carrying out the said reaction for preparation of the Product (I) under an oxidative condition. Thus, the reaction of alkylenebis(dithiocarbamic acid) in a salt form with a water-soluble divalent copper salt in the presence of a halogen ion under the condition that more than one molar amount of divalent copper ion to one molar amount of alkylenebis(dithiocarbamate) salt is present in the reaction system and under an oxidative condition gives the Product (II). In order to realize the oxidative condition, there may be employed a variety of oxidizing agents such as chlorine, bromine, chlorinated lime, oxygen, air, hydrogen peroxide or ozone, among which the use of air, i.e. aeration, is the most preferred from the economical viewpoint. Still, the maintenance of the reaction system in acid is here again favored for the oxidation. Other reaction conditions may be decided making reference to the descriptions relating to the production of the Product (I) and of the oxidation of the same to the Product (II).

The Product (II) is quite insoluble in water or a water-miscible organic solvent such as methanol or ethanol and can be recovered with ease from the reaction mixture, for instance, by simply filtrating.

Figure 1:
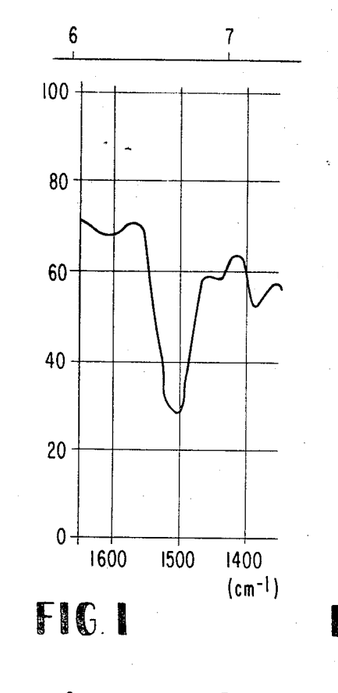
Figure 2:
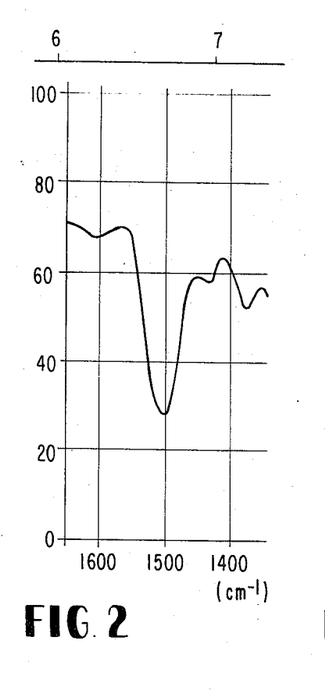
Figure 3:
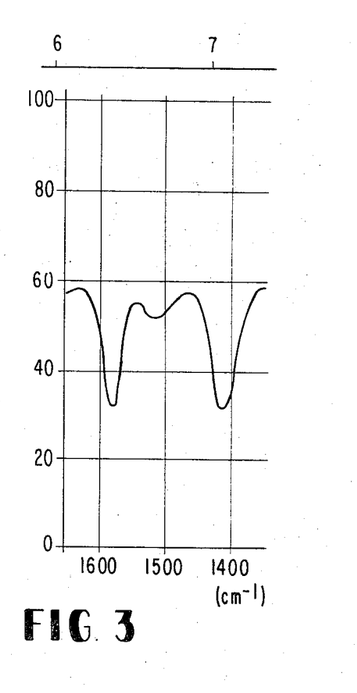
Figure 4:
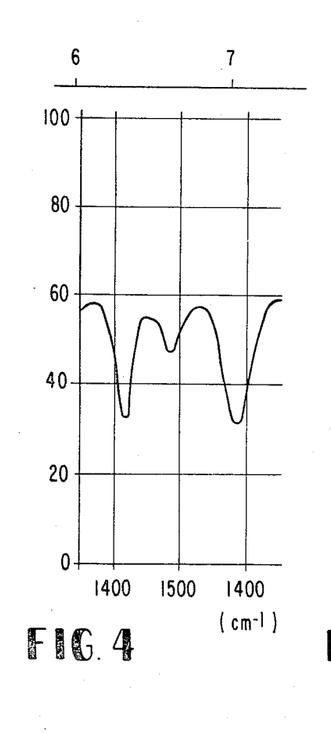
Figure 5:
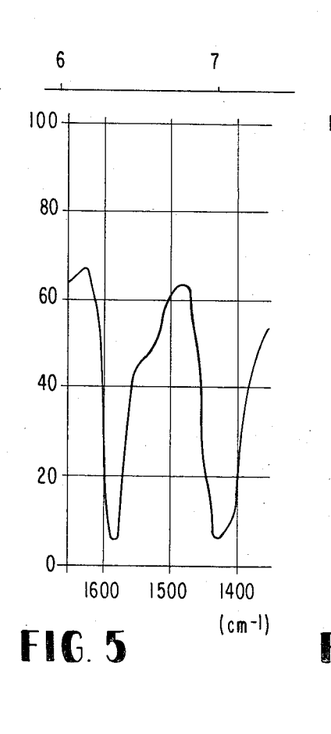
Figure 6:
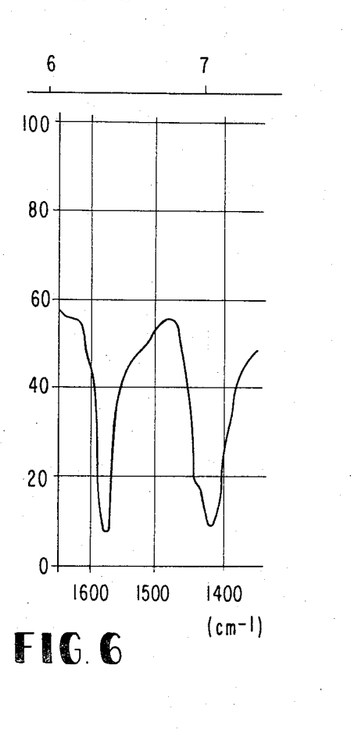

The exact chemical structures of the Product (I) and the Product (II) are not yet determined. However, it is clear that these are different from any of the known copper salts of alkylenebis(dithiocarbamic acid) in the content of halogen atoms, the characteristic infrared absorption maxima and the strong antimicrobial activity. For instance, the salts obtained by the reaction of disodium ethylenebis(dithiocarbamate) with cupric chloride in a molar ratio of 1 : 2 (cf. Example (44), the reaction of disodium ethylenebis(dithiocarbamate) with cupric sulfate in a molar ratio of 1 : 2 in the presence of sodium chloride (cf. Example 11), the reaction of the product, obtained by reacting disodium ethylenebis(dithiocarbamate) with cupric chloride in a molar ratio of 1 : 2, with chlorinated lime (cf. Examples 19 and 20) and the reaction of disodium ethylenebis(dithiocarbamate) with cupric sulfate in a molar ratio of 1 : 2 in the presence of sodium chloride while aeration (cf. Example 31) give the characteristic infrared absorption maxima at 1580 and 1420 cm$^{-1}$ as shown in FIGS. 3, 4, 5 and 6 of the accompanying drawings, whereas the salts obtained by the reaction of disodium ethylenebis(dithiocarbamate) with cupric sulfate in a molar ratio of 1 : 3 and the reaction of disodium ethylenebis(dithiocarbamate) with cupric chloride in a molar ratio of 3 : 2.5 have no such characteristic absorption maxima as shown in FIGS. 1 and 2 of the accompanying drawings.

As stated above, the Product (I) and the Product (II) exhibit strong antimicrobial activities, especially against a wide variety of phytopathogenic fungi. It is particularly notable that, compared with the known metal salts of alkylenebis(dithiocarbamic acid), the Product (I) and the Product (II) are much more stable and show a high and prolonged or residual activity in controlling various fungus infections in rice plants. Advantageously, they produce no material plant injury in the practical use. Moreover, they show very low toxicity against warm blooded animals and fishes and are of high safety to human beings. Therefore, they are useful for controlling plant diseases caused by phytopathogenic fungi and bacteria including diseases in rice plants (e.g. blast, Helmintosporium leaf spot, sheath blight, stem rot), diseases in cucumbers (e.g. downy mildew, anthracnose, powdery mildew), diseases in tomatoes (e.g. late blight, leaf mold, early blight, gray mold), diseases in egg plants (e.g. phytophthora rot), diseases in onions (e.g. Alteraria leaf spot), diseases in strawberries (e.g. gray mold), diseases in apples (e.g. Alternaria leaf spot), diseases in pears (e.g. black spot), diseases in citrus (e.g. canker), diseases in grapes (e.g. powdery mildew), etc. In comparison of these two products, the Product (II) is generally and somewhat superior to the Product (I) in the antimicrobial activity and the plant injury, although both are useful as antimicrobial agents. Still, they can product the reduction of mite populations on plants.

The Product (I) and the Product (II) may be applied as such, but they are usually admixed with an appropriate carrier material(s) to make such a preparation form(s) conventionally employed for agricultural chemicals as dust and wettable powder. The most economical carrier material is water, and their aqueous suspension may be practically and widely used. Other examples of the carrier material are clay, talc, kaolin, bentonite, sericite, etc. Various surfactants or wetting agents may be incorporated into such compositions. Moreover, any other agricultural chemicals such as herbicides, insecticides, fungicides, plant growth regulators and fertilizers may be also incorporated therein.

Practical and presently preferred embodiments of the present invention are illustratively shown in the following Examples wherein parts and percent are by weight.

EXAMPLE 1

To a solution of 10.9 g (0.03 mol) of $NaSSCHNCH_2CH_2-NHCSSNa \cdot 6H_2O$ in 150 ml of water, a solution of 6.7 g (0.039 mol) of $CuCl_2 \cdot 2H_2O$ in 150 ml of water is added at 30° C. After 3 hours, the reaction mixture is filtered. The collected substance is washed with water to remove free copper and chlorine ions and dried to give brown solid (8.8 g).

Elementary analysis: Cu, 27.4 percent; Cl, 5.77 percent. Characteristic infrared absorption maxima: 1580, 1420 cm$^{-1}$. Decomposing point: 162° – 167° C.

EXAMPLE 2

To a solution of 10.9 g (0.03 mol) of $NaSSCHNCH_2CH_2-NHCSSNa \cdot 6H_2O$ in 150 ml of water, a solution of 7.7 g (0.045 mol) of $CuCl_2 \cdot 2H_2O$ in 150 ml of water is added at 10° C. After 6 hours, the reaction mixture is filtered. The collected substance is washed with water and dried to give dark brown solid (9.3 g).

Elementary analysis: Cu, 29.6 percent; Cl, 8.10 percent. Characteristic infrared absorption maxima: 1580, 1420 cm$^{-1}$. Decomposing point: 158° – 162° C.

EXAMPLE 3

To a solution of 10.9 g (0.03 mol) of $NaSSCHNCH_2-CH_2NHCSSNa \cdot 6H_2O$ in 10 ml of water, a solution of 14.4 g (0.052 mol) of $ZnSO_4 \cdot 7H_2O$ in 100 ml of water is added at 20° C. After 2 hours, the reaction mixture is filtered. The collected substance is washed with water and suspended in 150 ml of water. To the suspension, a solution of 15.3 g (0.09 mol) of $CuCl_2 \cdot 2H_2O$ in 150 ml of water is added at 30° C. After 2 hours, the mixture is filtered. The collected substance is washed with water and dried to give brown solid (10.1 g)

Elementary analysis: Cu, 32.9 %; Cl, 9.2 %. Characteristic infrared absorption maxima: 1580, 1420 cm$^{-1}$. Decomposing point: 153° – 160° C.

EXAMPLE 4

To a solution of 10.9 g (0.03 mol) of $NaSSCHNCH_2CH_2-NHCSSNa \cdot 6H_2O$ in 150 ml of water, a solution of 10.3 g (0.06 mol) of $CuCl_2 \cdot 2H_2O$ in 150 ml of water is added at 70° C. After 6 hours, the reaction mixture is filtered. The collected substance is washed with water and dried to give greenish brown solid (10.0 g).

Elementary analysis: Cu, 31.2 %; Cl, 11.7 %. Characteristic infrared absorption maxima: 1580, 1420 cm$^{-1}$ (cf. FIG. 3 of the accompanying drawings). Decomposing point: 200° – 205° C.

EXAMPLE 5

To a solution of 10.9 g (0.03 mol) of $NaSSCHNCH_2-CH_2NHCSSNa \cdot 6H_2O$ in 100 ml of water, a solution of 3.5 g (0.065 mol) of $NH_4Cl$ in 50 ml of water is added. Then, a solution of 8.7 g (0.05 mol) of $CuCl_2 \cdot 2H_2O$ in 150 ml of water is added thereto at 50° C. After 4 hours, the reaction mixture is filtered. The collected substance is washed with water and dried to give brown solid (10.0 g).

Elementary analysis: Cu, 31.4 %; Cl, 9.3 % Characteristic infrared absorption maxima: 1580, 1420 cm$^{-1}$. Decomposing point: 155° – 162° C.

EXAMPLE 6

To a solution of 13.5 g (0.06 mol) of $CuBr_2$ in 150 ml of water, a solution of 10.9 g (0.03 mol) of $NaSSCHNCH_2CH_2-NHCSSNa \cdot 6H_2O$ in 130 ml of water is added with stirring at 25° C. After 5 hours, the reaction mixture is filtered. The collected substance is washed with water and dried to give yellowish brown solid (10.5 g).

Elementary analysis: Cu, 28.9 %; Br, 14.2 %. Characteristic infrared absorption maxima: 1580, 1420 cm$^{-1}$. Decomposing point: 162° –166° C.

EXAMPLE 7

To a mixture of 7.4 g of propylenediamine, 8 g of sodium hydroxide and 50 g of water, 15.2 g of carbon disulfide are added to produce NaSSCHNCH$_2$CH(CH$_3$)NHCSSNa (0.1 mol). The resultant mixture is diluted with water to make 500 ml, neutralized and warmed to 40° C. To the mixture, a solution of 34 g (0.2 mol) of CuCl$_2$·2H$_2$O in 400 ml of water is added under stirring. After 3 hours, the reaction mixture is filtered. The collected substance is washed with water and dried to give yellowish brown solid (33 g).

Elementary analysis: Cu, 29.1 %; Cl, 7.2 %. Decomposing point: 159°– 163° C.

EXAMPLE 8

To a solution of 15.6 g (0.05 mol) of NaSSCHN(CH$_2$)$_6$-NHCSSNa in 200 ml of water, a solution of 17 g (0.1 mol) of CuCl$_2$·2H$_2$O in 200 ml of water is added at 80° C. After 5 hours, the reaction mixture is filtered. The collected substance is washed with water and dried to give yellowish brown solid (18 g).

Elementary analysis: Cu, 27.4 %; Cl, 8.71 %. Decomposing point: 157°–163° C.

EXAMPLE 9

To a solution of 21.8 g (0.06 mol) of NaSSCHNCH$_2$CH$_2$-NHCSSNa·6H$_2$O and 7 g (0.12 mol) of NaCl in 250 ml of water, a solution of 19.5 g (0.078 mol) of CuSO$_4$·5H$_2$O in 250 ml of water is added at 60° C. After 5 hours, the reaction mixture is filtered. The collected substance is washed with water and dried to give brown solid (17 g).

Elementary analysis: Cu, 28.1 %; Cl, 4.8 %. Characteristic infrared absorption maxima: 1580, 1420 cm$^{-1}$. Decomposing point: 155°– 160° C.

EXAMPLE 10

To a solution of 21.8 g (0.06 mol) of NaSSCHNCH$_2$CH$_2$-NHCSSNa·6H$_2$O and 7 g (0.12 mol) of NaCl in 250 ml of water, a solution of 27.5 g (0.11 mol) of CuSO$_4$·5H$_2$O in 250 ml of water is added at 30° C. After 3 hours, the reaction mixture is filtered. The collected substance is washed with water and dried to give brown solid (19 g).

Elementary analysis: Cu, 32.7 %; Cl, 8.4 %. Characteristic infrared absorption maxima: 1580, 1420 cm$^{-1}$. Decomposing point: 165°– 170° C.

EXAMPLE 11

To a solution of 21.8 g (0.06 mol) of NaSSCHNCH$_2$CH$_2$-NHCSSNa·6H$_2$O and 7.6 g (0.13 mol) of NaCl in 250 ml of water, a solution of 31.6 g (0.126 mol) of CuSO$_4$·5H$_2$O in 250 ml of water is added at 60° C. After 5 hours, the reaction mixture is filtered. The collected substance is washed with water and dried to give greenish brown solid (19 g).

Elementary analysis: Cu, 31.7 %; Cl, 12.5 %. Characteristic infrared absorption maxima: 1580, 1420 cm$^{-1}$ (cf. FIG. 4 of the accompanying drawings). Decomposing point: 195°– 198° C.

EXAMPLE 12

To a solution of 21.8 g (0.06 mol) of NaSSCHNCH$_2$-CH$_2$NHCSSNa·6H$_2$O and 18 g (0.15 mol) of KBr in 250 ml of water, a solution of 31.5 g (0.125 mol) of CuSO$_4$·5H$_2$O in 250 ml of water is added at 60° C. After 5 hours, the reaction mixture is filtered. The collected substance is washed with water and dried to give yellowish brown solid (23 g).

Elementary analysis: Cu, 27.8 %; Br, 21.4 %. Characteristic infrared absorption maxima: 1580, 1420 cm$^{-1}$. Decomposing point: 188°– 193° C.

EXAMPLE 13

To a solution of 21.8 g (0.06 mol) of NaSSCHNCH$_2$CH$_2$-NHCSSNa·6H$_2$O and 20 g (0.12 mol) of KI in 250 ml of water, a solution of 27.5 g (0.11 mol) of CuSO$_4$·5H$_2$O in 250 ml of water is added at 30° C. After 5 hours, the reaction mixture is filtered. The collected substance is washed with water and dried to give yellowish brown solid (28 g).

Elementary analysis: Cu, 25.3 %; I, 29.4 %. Characteristic infrared absorption maxima: 1580, 1420 cm$^{-1}$. Decomposing point: 158°– 161° C.

EXAMPLE 14

To a solution of 21.8 g (0.06 mol) of NaSSCHNCH$_2$CH$_2$-NHCSSNa·6H$_2$O and 1.8 g (0.03 mol) of NaCl in 250 ml of water, a solution of 31.6 g (0.126 mol) of CuSO$_4$·5H$_2$O in 250 ml of water is added at 60° C. After 5 hours, the reaction mixture is filtered. The collected substance is washed with water and dried to give brown solid (17.5 g).

Elementary analysis: Cu, 31.7 %; Cl, 5.7 %. Characteristic infrared absorption maxima: 1580, 1420 cm$^{-1}$. Decomposing point: 157°–162° C.

EXAMPLE 15

To a solution of 21.8 g (0.06 mol) of NaSSCHNCH$_2$-CH$_2$NHCSSNa·6H$_2$O and 9.6 g (0.18 mol) of NH$_4$Cl in 250 ml of water, a solution of 36.5 g (0.15 mol) of Cu(NO$_3$)$_2$·3H$_2$O in 250 ml of water is added at 60° C. After 5 hours, the reaction mixture is filtered. The collected substance is washed with water and dried to give greenish brown solid (20.5 g).

Elementary analysis: Cu, 28.9 %; Cl, 12.7 %. Characteristic infrared absorption maxima: 1580, 1420 cm$^{-1}$. Decomposing point: 200°– 205° C.

EXAMPLE 16

To a solution of 21.8 g (0.06 mol) of NaSSCHNCH$_2$CH$_2$-NHCSSNa·6H$_2$O in 290 ml of water, a solution of 31.5 g (0.125 mol) of CuSO$_4$·5H$_2$O in 250 ml of water is added at 30° C, and then 6 g (0.058 mol) of conc. hydrochloric acid are added thereto. After 5 hours, the reaction mixture is filtered. The collected substance is washed with water and dried to give brown solid (18 g).

Elementary analysis: Cu, 31.4 %; Cl, 8.7 %. Characteristic infrared absorption maxima: 1580, 1420 cm$^{-1}$. Decomposing point: 151°– 154° C.

EXAMPLE 17

To a mixture of 7.4 g of 1,2-propylenediamine, 8 g of sodium hydroxide and 50 g of water, 15.2 g of carbon disulfide are added to produce NaSSCHNCH$_2$CH(CH$_3$)NHCSSNa (0.1 mol). The resulting mixture is diluted with 500 ml of water, neutralized and 11.8 g (0.2 mol)

of sodium chloride are dissolved therein. The resultant solution is warmed to 50° C, and a solution of 50 g (0.2 mol) of $CuSO_4·5H_2O$ in 400 ml of water is added thereto. After 5 hours, the reaction mixture is filtered. The collected substance is washed with water and dried to give yellowish brown solid (31.5 g).

Elementary analysis: Cu, 28.8 %; Cl, 9.4 %. Decomposing point: 178°–183° C.

EXAMPLE 18

To a mixture of 11.6 of hexamethylenediamine, 8 g of sodium hydroxide and 60 g of water, 15.2 g of carbon disulfide are added to produce $NaSSCHN(CH_2)_6NHCSSNa$ (0.1 mol). The resulting mixture is diluted with 500 ml of water, neutralized and 11.8 g (0.2 mol) of sodium chloride are dissolved therein. The resultant solution is warmed to 40° C, and a solution 50 g (0.2 mol) of $CuSO_4·5H_2O$ in 500 ml of water is added thereto. After 5 hours, the reaction mixture is filtered. The collected substance is washed with water and dried to give yellowish brown solid (34 g).

Elementary analysis: Cu, 27.8 %; Cl, 8.2 %. Decomposing point: 160°–163° C.

EXAMPLE 19

To a mixture of 36.4 g (0.1 mol) of $NaSSCHNCH_2CH_2-NHCSSNa · 6H_2O$ in 350 ml of water, a solution of 34.1 g (0.2 mol) of $CuCl_2·2H_2O$ in 350 ml of water is added at 60° C. After 5 hours, the reaction mixture is filtered. The collected substance is washed with water and dried to give greenish brown solid (34 g).

Elementary analysis: Cu, 32.7 %; Cl, 11.45 %. Decomposing point: 205°–210° C.

EXAMPLE 20

The solid product (10 g) obtained in Example 19 is pulverized in a mortar and suspended in 250 ml of water. To the suspension, 97 g of conc. hydrochloric acid are added, and then 16 g of chlorinated lime are added thereto at 50° C in about 30 minutes. After 30 minutes, the reaction mixture is filtered. The collected substance is washed with water and dried to give yellowish brown solid (4.8 g).

Elementary analysis: Cu, 20.86 %; Cl, 11.43 %. Characteristic infrared absorption maxima: 1580, 1420 $cm^{-1}$. (cf. FIG. 5 of the accompanying drawings). Decomposing point: 200°–205° C.

EXAMPLE 21

The solid product (10 g) obtained in Example 19 is pulverized in a mortar and suspended in 100 ml of water. After warming to 40° C, 7 g of chlorine gas are introduced into the suspension. After 1 hour, the reaction mixture is filtered. The collected substance is washed with water and dried to give yellowish brown solid (3.5 g).

Elementary analysis: Cu, 21.24 %; Cl, 10.97 %. Decomposing point: 175°–180° C.

EXAMPLE 22

The solid product (10 g) obtained in Example 19 is pulverized in a mortar and suspended in 100 ml of water. After warming to 30° C, 10 g of bromine are added thereto. The resultant mixture is then stirred for 1 hour. The reaction mixture is filtered. The collected substance is washed with water and dried to give yellowish brown solid (6.5 g).

Elementary analysis: Cu, 22.13 %; Cl, 11.43 %. Decomposing point: 195°–205° C.

EXAMPLE 23

To a solution of 21.8 g (0.06 mol) of $NaSSCHNCH_2CH_2-NHCSSNa·6H_2O$ in 250 ml of water, a solution 22.5 g (0.132 mol) of $CuCl_2·2H_2O$ in 250 ml of water is added at 60° C. After 5 hours, the resultant mixture is cooled to 50° C, and 200 g of conc. hydrochloric acid are added thereto. To the resulting mixture, 35 g of chlorinated lime are added. After 1 hour, the reaction mixture is filtered. The collected substance is washed with water and dried to give yellowish brown solid (13 g).

Elementary analysis: Cu, 20.24 %; Cl, 11.77 %. Decomposing point: 205°–210° C.

EXAMPLE 24

To a solution of 21.8 g (0.06 mol) of $NaSSCHNCH_2CH_2-NHCSSNa·6H_2O$ in 250 ml of water, a solution of 27.0 g (0.12 mol) of $CuBr_2$ in 250 ml of water is added at 70° C. After 5 hours, 150 g of conc. hydrochloric acid are added thereto, and then 35 g of chlorinated lime are added. After 1 hour, the reaction mixture is filtered. The collected substance is washed with water and dried to give yellowish brown solid (14.5 g).

Elementary analysis: Cu, 18.14 %; Br, 22.71 %. Decomposing point: 190°–195° C.

EXAMPLE 25

To a solution of 36.4 g (0.1 mol) of $NaSSCHNCH_2CH_2·6H_2O$ in 350 ml of water, a solution of 36 g (0.21 mol) of $CuCl_2·2H_2O$ in 350 ml of water is added at 60° C. After 4 hours, 40 g of conc. hydrochloric acid are added thereto, and air is introduced therein at a rate of 2 liters per minute for 3 hours. The reaction mixture is filtered. The collected substance is washed with water and dried to give yellowish brown solid (24 g).

Elementary analysis: Cu, 21.03 %; Cl, 11.27 %. Decomposing point: 205°–209° C.

EXAMPLE 26

To a solution of 36.4 g (0.1 mol) of $NaSSCHNCH_2-CH_2NHCSSNa·6H_2O$ in 350 ml of water, a solution of 37.5 g (0.22 mol) of $CuCl_2·2H_2O$ in 350 ml of water is added at 60° C. Then, 40 g of conc. hydrochloric acid are added, and air is introduced therein at a rate of 2 liters per minute for 5 hours. The reaction mixture is filtered. The collected substance is washed with water and dried to give yellowish brown solid (25.5 g).

Elementary analysis: Cu, 21.43 %; Cl, 11.31 %. Decomposing point: 207°–212° C.

EXAMPLE 27

To a solution of 7.4 g of 1,2-propylenediamine in 20 ml of water, 15.2 g of carbon disulfide are added, and a solution of 8 g of sodium hydroxide in 20 ml of water is added thereto to produce $NaSSCHNCH_2CH(CH_3$ )NHCSSNa (0.1 mol). The resultant solution is diluted with water to make 350 ml, and a solution of 34.1 g (0.2 mol) of $CuCl_2 \cdot 2H_2O$ in 350 ml of water is added thereto at 70° C. After 5 hours, the resulting mixture is cooled to 50° C, 200 g of conc. hydrochloric acid are added thereto, and then 30 g of chlorinated lime are added. After 1 hour, the reaction mixture is filtered. The collected substance is washed with water and dried to give yellowish brown solid (21 g).

Elementary analysis: Cu, 19.83 %; Cl, 10.74 %. Decomposing point: 167°–173°C.

EXAMPLE 28

To a solution of 11.6 g of hexamethylenediamine in 30 ml of water, 15.2 g of carbon disulfide are added, and a solution of 8 g sodium hydroxide in 30 ml of water is added to produce $NaSSCHN(CH_2)_6NHCSSNa$ (0.1 mol). The resultant solution is diluted with water to make 400 ml, and a solution of 37.5 g (0.22 mol) of $CuCl_2 \cdot 2H_2O$ in 350 ml of water is added at 60° C. After 5 hours, 180 g of conc. hydrochloric acid are added, and then 30 g of chlorinated lime are added thereto. After 1 hour, the reaction mixture is filtered. The collected substance is washed with water and dried to give yellowish brown solid (23 g).

Elementary analysis: Cu, 17.82 %; Cl, 9.57 %. Decomposing point: 158°–162°C.

EXAMPLE 29

To a solution of 36.4 g (0.1 mol) of $NaSSCHNCH_2CH_2\text{-}NHCSSNa \cdot 6H_2O$ and 11.7 g (0.2 mol) of NaCl in 350 ml of water, a solution of 52.5 g (0.21 mol) of $CuSO_4 \cdot 5H_2O$ in 400 ml of water is added at 60° C. After 5 hours, the precipitate is collected by filtration, washed with water and dried to give greenish brown solid (34.5 g).

Elementary analysis: Cu, 32.44 %; Cl, 11.81 %. Decomposing point: 200°–205°C.

EXAMPLE 30

The solid product (10 g) obtained in Example 29 is pulverized in a mortar and suspended in 250 ml of water. To the suspension, 97 g of conc. hydrochloric acid are added, and then 16 g of chlorinated lime are added thereto at 50° C in about 30 minutes. After 1 hour, the reaction mixture is filtered. The collected substance is washed with water and dried to give yellowish brown solid (5.0 g).

Elementary analysis: Cu, 20.23 %; Cl, 11.37 %. Decomposing point: 198°–205°C.

EXAMPLE 31

To a solution of 21.8 g (0.06 mol) of $NaSSCHNCH_2CH_2\text{-}NHCSSNa \cdot 6H_2O$ and 7.6 g (0.13 mol) of NaCl in 250 ml of O,O-Dethyl-S-benxylthiophosphate water, a solution of 31.6 g (0.126 mol) of $CuSO_4 \cdot 5H_2O$ in 250 ml of water is added at 60° C. Then, 30 g of conc. hydrochloric acid are added thereto. Air is introduced therein at a rate of 1 liter per minute for 5 hours. The reaction is filtered. The collected substance is washed with water and dried to give yellowish brown solid (15 g).

Elementary analysis: Cu, 20.49 %; Cl, 11.07 %. Characteristic infrared absorption maxima: 1580, 1420 $cm^{-1}$ (cf. FIG. 6 of the accompanying drawings). Decomposing point: 205°–210°C.

EXAMPLE 32

To a solution of 21.8 g (0.06 mol) of $NaSSCHNCH_2CH_2\text{-}NHCSSNa \cdot 6H_2O$ and 18 g (0.15 mol) of KBr in 250 ml of water, a solution of 31.5 g (0.126 mol) of $CuSO_4 \cdot 5H_2O$ in 250 ml of water is added. After addition of 30 g of conc. hydrochloric acid, air is introduced therein at a rate of 1 liter per minute for 5 hours. The reaction mixture is filtered. The collected substance is washed with water and dried to give yellowish brown solid (20 g).

Elementary analysis: Cu, 18.21 %; Br, 22.15 %. Decomposing point: 185°–190°C.

REFERENCE EXAMPLE

To a solution of 10.9 g (0.03 mol) of $NaSSCHNCH_2CH_2\text{-}NHCSSNa \cdot 6H_2O$ in 100 ml of water, a solution of 4.3 g (0.025 mol) of $CuCl_2 \cdot 2H_2O$ in 100 ml of water is added at room temperature. After 5 hours, the reaction mixture is filtered. The collected substance is washed with water to give dark brown solid (6.7 g).

Elementary analysis: Cu, 23.9 %; Cl, 0.4 %. No infrared absorption maxima at 1580 and 1420 $cm^{-1}$ (cf. FIG. 2 of the accompanying drawings).

EXAMPLE A

| | Parts |
|---|---|
| Product in Example 1 | 25 |
| Kaolin | 60 |
| Sodium alkylsulfate | 10 |
| Sodium ligninsulfonate | 5 |

The above materials are mixed uniformly to make a wettable powder preparation.

EXAMPLE B

| | Parts |
|---|---|
| Product in Example 22 | 25 |
| Kaolin | 60 |
| Sodium alkylsulfate | 10 |
| Sodium ligninsulfonate | 5 |

The above materials are mixed uniformly to make a wettable powder preparation.

EXAMPLE C

| | Parts |
|---|---|
| Product in Example 2 | 5 |
| Kaolin | 90 |
| Sodium alkylsulfate | 5 |

The above materials are mixed uniformly to make a dust preparation.

EXAMPLE D

| | Parts |
|---|---|
| Product in Example 14 | 5 |
| Kaolin | 90 |
| Sodium alkylsulfate | 5 |

The above materials are mixed well to make a dust preparation.

EXAMPLE E

| | Parts |
|---|---|
| Product in Example 25 | 5 |

| | |
|---|---|
| Kaolin | 90 |
| Sodium alkylsulfate | 5 |

The above materials are mixed uniformly to make a dust preparation.

Some of the test results which support the excellent antimicrobial activity of the Product (I) and the Product (2) are shown below, compared with some copper salts of alkylenebis(dithiocarbamic acid) prepared by conventional procedures and some known antimicrobial agents.

TEST 1

In a test tube of 1 cm in diameter and 10 cm in length, 1 ml of an aqueous suspension of the test compound was charged, and 1 ml of a spore suspension of Piricularia oryzae or Cochliobolus miyabeanus was added thereto. After shaking well, 0.3 ml of the mixture was pipetted and dropped on a glass plate. The plate was kept in a wet room at 28° C for 24 hours. The germination situation of the spores on the plate was then observed under a 150 fold microscope to determine the minimum inhibitory concentration of the test compound against germination (i.e. the minimum concentration of the test compound producing 100 percent inhibition of germination).

The results are shown in Table 1.

TABLE 1

| Test compound*) | Minimum inhibitory ($\gamma$/ml) | concentration |
|---|---|---|
| | Piricularia oryzae | Cochliobolus miyabeanus |
| 1 | 10.0 | 10.0 |
| 2 | 5.0 | 10.0 |
| 3 | 2.5 | 5.0 |
| 4 | 1.0 | 2.5 |
| 5 | 2.5 | 5.0 |
| 6 | 2.5 | 5.0 |
| 7 | 2.5 | 5.0 |
| 8 | 2.5 | 5.0 |
| Product in Reference Example | 25 | 50 |
| cuprous complex salt | 50 | 100 |
| Pentachlorobenzyl alcohol | >100 | — |
| O,O-Diethyl-S-benzyl-thiophosphate | 25 | — |

*) The numeral corresponds to the number of each Example. The product in Reference Example is the product from the reaction between disodium ethylenebis(dithiocarbamate) and cupric chloride in a molar ratio of 3 : 2.5. The cuprous complex salt is the product from the reaction between disodium ethylenebis(dithiocarbamate) and cuprous chloride in a molar ratio of 1:4.

TEST 2

In the same manner as in Test 1, the minimum inhibitory concentrations of some test compounds against the germination of the spores of Piricularia oryzae and Cochliobolus miyabeanus were determined.

The results are shown in Table 2.

TABLE 2

| Test compound *) | Minimum inhibitory ($\gamma$/ml) | Concentration |
|---|---|---|
| | Piricularia oryzae | Cochliobolus miyabeanus |
| 9 | 10.0 | 10.0 |
| 10 | 5.0 | 10.0 |
| 11 | 1.0 | 2.5 |
| 12 | 1.0 | 2.5 |
| 13 | 5.0 | 20.0 |
| 14 | 2.5 | 5.0 |
| 15 | 1.0 | 2.5 |
| 16 | 10.0 | 10.0 |
| 17 | 2.5 | 10.0 |
| 18 | 5.0 | 10.0 |
| Cupric ethylenebis-(dithiocarbamate) | 25 | 50 |
| Pentachlorobenzyl alcohol | >100 | — |
| O,O-Diethyl-S-benzyl-thiophosphate | 25 | — |

*) See the remarks under Table 1.

TEST 3

In the same manner as in Test 1, the minimum inhibitory concentrations of some test compounds against the germination of the spores of Piricularia oryzae and Cochliobolus miyabeanus were determined.

The results are shown in Table 3.

TABLE 3

| Test compound *) | Minimum inhibitory ($\gamma$/ml) | concentration |
|---|---|---|
| | Piricularia oryzae | Cochliobolus miyabeanus |
| 1 | 10.0 | 10.0 |
| 2 | 5.0 | 10.0 |
| 4 | 1.25 | 2.5 |
| 5 | 2.5 | 5.0 |
| 10 | 5.0 | 10.0 |
| 12 | 2.5 | 2.5 |
| 15 | 2.5 | 2.5 |
| 16 | 10.0 | 10.0 |
| 20 | 1.25 | 10.0 |
| 23 | 1.25 | 5.0 |
| 24 | 2.5 | 10.0 |
| 26 | 1.25 | 2.5 |
| 30 | 1.25 | 10.0 |
| 31 | 1.25 | 5.0 |
| 32 | 1.25 | 10.0 |
| O,O-Diethyl-S-benzyl-thiophosphate thiophosphate | 25.0 | — |
| Pentachlorobenzyl alcohol | >100 | — |
| Product in Reference Example | 25 | 50 |
| Cupric ethylenebis(di-thiocarbamate | 25 | 50 |
| cuprous complex salt | 50 | 100 |

*) See the remarks under Table 1.

TEST 4

The test compound in wettable powder form was diluted with water to a designed concentration and applied to rice plants of fourth-leaf stage cultured in pots. After drying in air, a spore suspension of Piricularia oryzae or Cochlibolus miyabeanus was sprayed thereon. On the 4th day after spraying, the number of infectious spots per plant was counted, and the prevention value was calculated according to the following equation:

$$\text{Prevention value } (\%) = \frac{\text{Average number of infectious spots per plant in the untreated plot} - \text{Average number of infectious spots per plant in the treated plot}}{\text{Average number of infectious spots per plant in the untreated plot}} \times 100$$

The results are shown in Table 4.

TABLE 4

| Test compound *) | Concentration (ppm) | Piricularia oryzae Average number of infectious spots per plant | Prevention value (%) | Cochliobolus miyabeanus Average number of infectious spots per plant | Prevention value (%) |
|---|---|---|---|---|---|
| 1 | 300 | 10.32 | 69.5 | 18.52 | 69.2 |
| 2 | 300 | 9.87 | 70.8 | 17.31 | 71.2 |
| 3 | 300 | 6.42 | 81.0 | 12.44 | 79.4 |
| 4 | 300 | 6.23 | 81.6 | 11.22 | 81.4 |
| 5 | 300 | 9.21 | 72.8 | 14.37 | 76.1 |
| 6 | 300 | 8.42 | 75.1 | 13.23 | 78.0 |
| 7 | 300 | 9.33 | 72.4 | 13.33 | 77.8 |
| 8 | 300 | 7.43 | 78.0 | 11.81 | 80.4 |
| Product in Reference Example | 300 | 17.88 | 47.1 | 33.62 | 43.7 |
| Cuprous complex salt | 300 | 15.43 | 54.4 | 38.41 | 36.1 |
| Pentachlorobenzyl alcohol | 500 | 9.74 | 71.2 | 27.44 | 54.4 |
| O,O-Diethyl-S-benzylthiophosphate | 500 | 12.0 | 64.5 | 16.13 | 73.2 |
| Untreated | — | 33.78 | — | 60.12 | — |

*) See the remarks under Table 1.

TEST 5

In the same manner as in Test 4, the prevention values of some test compounds against infection with Piricularia oryzae and Cochliobolus miyabeanus were determined.

The results are shown in Table 5.

TABLE 5

| Test compound *) | Concentration (ppm) | Piricularia oryzae Average number of infectious spots per plant | Prevention value (%) | Cochliobolus miyabeanus Average number of infectious spots per plant | Prevention value (%) |
|---|---|---|---|---|---|
| 9 | 300 | 12.53 | 67.4 | 19.05 | 65.2 |
| 10 | 300 | 10.03 | 73.9 | 16.80 | 69.3 |
| 11 | 300 | 6.03 | 84.3 | 9.19 | 83.2 |
| 12 | 300 | 7.22 | 81.2 | 10.73 | 80.4 |
| 13 | 300 | 11.26 | 70.7 | 15.16 | 72.3 |
| 14 | 300 | 8.15 | 78.8 | 14.01 | 74.4 |
| 15 | 300 | 6.84 | 82.2 | 9.91 | 81.9 |
| 16 | 300 | 12.22 | 68.2 | 18.94 | 65.4 |
| 17 | 300 | 9.87 | 74.3 | 13.41 | 75.5 |
| 18 | 300 | 9.53 | 75.2 | 14.56 | 73.4 |
| Cupric ethylene-bis(dithiocarbamate) | 300 | 21.40 | 44.3 | 31.31 | 42.8 |
| Pentachlorobenzyl alcohol | 500 | 10.33 | 73.1 | 22.77 | 58.4 |
| O,O-Diethyl-S-benzylthiophosphate | 500 | 11.83 | 69.2 | 12.75 | 76.7 |
| Untreated | — | 38.42 | — | 54.73 | — |

*) See the remarks under Table 1.

TEST 6

In the same manner as in Test 4, the prevention values of some test compounds against infection with Piricularia oryzae and Cochliobolus miyabeanus were determined.

The results are shown in Table 6.

TABLE 6

| Test compound *) | Concentration (ppm) | Piricularia oryzae Average number of infectious spots per plant | Prevention value (%) | Cochliobolus miyabeanus Average number of infectious spots per plant | Prevention value (%) |
|---|---|---|---|---|---|
| 1 | 300 | 10.4 | 70.8 | 19.2 | 68.7 |
| 2 | 300 | 10.0 | 71.4 | 18.4 | 70.0 |
| 4 | 300 | 7.2 | 79.3 | 12.0 | 80.4 |
| 5 | 300 | 9.8 | 72.0 | 15.4 | 74.6 |
| 10 | 300 | 10.9 | 68.8 | 17.1 | 72.0 |
| 12 | 300 | 7.4 | 79.0 | 11.3 | 81.7 |
| 15 | 300 | 7.2 | 79.3 | 10.1 | 83.2 |
| 16 | 300 | 14.2 | 59.6 | 19.3 | 68.5 |
| 20 | 300 | 6.5 | 80.8 | 15.0 | 75.5 |
| 23 | 300 | 6.3 | 82.0 | 9.4 | 84.6 |
| 24 | 300 | 5.8 | 83.3 | 9.0 | 85.2 |
| 26 | 300 | 6.2 | 82.2 | 9.7 | 84.2 |
| 30 | 300 | 7.1 | 79.5 | 16.7 | 72.8 |
| 31 | 300 | 6.8 | 80.5 | 10.4 | 83.0 |
| 32 | 300 | 7.3 | 79.1 | 9.6 | 84.7 |
| O,O-Diethyl-S-benzylthiophosphate | 500 | 14.2 | 59.6 | 17.0 | 72.2 |
| Pentachlorobenzyl alcohol | 500 | 10.0 | 71.4 | 28.2 | 54.0 |
| Product in Reference Example | 300 | 18.0 | 48.5 | 34.5 | 43.4 |
| Cupric ethylene-bis(dithiocarbamate) | 300 | 18.0 | 48.5 | 32.4 | 46.8 |
| Cuprous complex salt | 300 | 16.0 | 54.2 | 39.3 | 35.5 |
| Untreated | — | 35.0 | — | 60.8 | — |

*) See the remarks under Table 1.

TEST 7

The test compound in wettable powder form was diluted with water to make a designed concentration and applied to the onions grown in the field of 2.8 m² per plot in four replicates per each concentration once a week at a rate of 100 to 300 liters per 10 a for 3 weeks. Then, the infection of the onions with Alternaria porri was observed to determine the number of infectious spots and calculate the rate of diseased leaves according to the following equation:

$$\text{Rate of diseased leaves (\%)} = \frac{\text{Number of diseased leaves}}{\text{Total number of tested leaves}} \times 100$$

The results are shown in Table 7.

TABLE 7

| Test compound *) | Concentration (ppm) | Infectious spots per leaf | Rate of diseased leaves (%) |
|---|---|---|---|
| 11 | 500 | 0.14 | 9.5 |
|  | 1000 | 0.12 | 9.2 |
|  | 1500 | 0.1 | 8.0 |
| 14 | 500 | 0.15 | 9.4 |
|  | 1000 | 0.14 | 9.8 |
|  | 1500 | 0.12 | 8.8 |
| 18 | 500 | 0.19 | 9.9 |
|  | 1000 | 0.19 | 9.7 |
|  | 1500 | 0.15 | 9.0 |
| Zinc ethylene-bis(dithiocarbamate) | 1083 | 0.13 | 10.5 |
|  | 1625 | 0.14 | 9.5 |
| Manganese | 1077 | 0.13 | 12.1 |

| | | | |
|---|---|---|---|
| ethylenebis(di-thiocarbamate) | 1750 | 0.20 | 9.5 |
| Untreated | — | 0.33 | 16.2 |

*) See the remarks under Table 1.

TEST 8

The test compound in wettable powder form was diluted with water to make 1000 ppm concentration and applied to the onions grown in the field of 1.2 m × 2.3 m per plot in three replicates per each test compound once a week at a rate of 100 to 300 liters per 10 a for 7 weeks. Then, the infection of the onions with Alternaria porri was observed to determine the number of infectious spots per leaf.

The results are shown in Table 8.

TABLE 8

| Test compound *) | Concentration (ppm) | No. of infectious spots per leaf |
|---|---|---|
| 1 | 1000 | 0.63 |
| 4 | 1000 | 0.35 |
| 7 | 1000 | 0.43 |
| 8 | 1000 | 0.50 |
| 11 | 1000 | 0.38 |
| 12 | 1000 | 0.40 |
| 14 | 1000 | 0.59 |
| 17 | 1000 | 0.46 |
| 20 | 1000 | 0.38 |
| 21 | 1000 | 0.45 |
| 23 | 1000 | 0.41 |
| 26 | 1000 | 0.35 |
| 30 | 1000 | 0.46 |
| 31 | 1000 | 0.39 |
| 32 | 1000 | 0.42 |
| Manganese ethylenebis-(dithiocarbamate) | 1000 | 0.68 |
| Product in Reference Example | 1000 | 0.98 |
| Cupric ethylenebis-(dithiocarbamate) | 1000 | 1.21 |
| Cuprous complex salt | 1000 | 0.83 |
| Untreated | — | 1.55 |

*) See the remarks under Table 1.

TEST 9

The test compound in wettable powder form was diluted with water to make a designed concentration and applied to the cucumbers grown in the field of 3.7 m² per plot in three replicates per each concentration once a week at a rate of 100 to 300 liters per 10 a for 3 weeks. Then, the infection of the cucumbers with Pseudoperonospora cubensis was observed to determine the rate of diseased leaves as in Test 8 and calculate the index of infection according to the following equation:

$$\text{Index of infection} = \frac{\Sigma \text{Infection grade} \times \text{Number of leaves in the infection grade}}{\text{Total number of tested leaves}}$$

wherein the infection grade is based on the following criteria:

| Grade | Observation |
|---|---|
| 0 | No infection |
| 1 | Slight infection |
| 2 | Medium infection |
| 3 | Serious infection |

The results are shown in Table 9.

TABLE 9

| Test compound *) | Concentration (ppm) | Rate of diseased leaves (%) | Index of infection |
|---|---|---|---|
| 11 | 500 | 35.2 | 0.42 |
| | 1000 | 31.0 | 0.30 |
| 14 | 500 | 38.7 | 0.5 |
| | 1000 | 33.9 | 0.35 |
| 18 | 500 | 39.5 | 0.36 |
| | 1000 | 35.4 | 0.36 |
| Manganese ethylenebis(di-thiocarbamate) | 1077 | 36.8 | 0.36 |
| Untreated | — | 48.5 | 0.63 |

*) See the remarks under Table 1.

TEST 10

The test compound in wettable powder form was diluted with water to make 1000 ppm concentration and applied to the cucumbers grown in the field of 1 m × 1.8 m per plot once a week at a rate of 280 liters per 10 a for 6 weeks. Then, the infection of the cucumbers with Sphaerotheca fuliginea was observed to determine the index of infection according to the following equation:

$$\text{Index of infection} = \frac{\Sigma \text{Infection grade} \times \text{Number of leaves in the infection grade}}{\text{Total number of tested leaves}}$$

wherein the infection grade is based on the following criteria:

| Grade | Rate of infectious area (%) |
|---|---|
| 0 | 0 |
| 1 | 0 to 30 |
| 2 | 30 to 60 |
| 3 | 60 to 100 |

The results are shown in Table 10.

TABLE 10

| Test compound *) | Concentration (ppm) | No. of infectious spots per leaf |
|---|---|---|
| 1 | 1000 | 0.48 |
| 4 | 1000 | 0.28 |
| 7 | 1000 | 0.35 |
| 8 | 1000 | 0.41 |
| 11 | 1000 | 0.40 |
| 12 | 1000 | 0.35 |
| 14 | 1000 | 0.41 |
| 17 | 1000 | 0.45 |
| 20 | 1000 | 0.10 |
| 21 | 1000 | 0.19 |
| 23 | 1000 | 0.15 |
| 26 | 1000 | 0.13 |
| 30 | 1000 | 0.12 |
| 31 | 1000 | 0.15 |
| 32 | 1000 | 0.20 |
| Manganese ethylenebis-(dithiocarbamate) | 1000 | 0.55 |
| Product in Reference Example Cupric | 1000 | 0.88 |

| | 1000 | 0.93 |
|---|---|---|
| ethylenebis-(dithiocarbamate) | | |
| Cuprous complex salt | 1000 | 0.90 |
| Untreated | — | 0.95 |

*) See the remarks under Table 1.

TEST 11

The test compound in wettable powder form was diluted with water to make 1000 ppm concentration and applied to the pear trees grown in the field once a week at a rate of 110 liters per 10 a for 5 weeks. Then, the infection of the pear trees with Alternaria kikuchiana was observed on 250 leaves to determine the number of infectious spots per leaf. The plant injury was also determined by observing russets in the following criteria:

| Russets | Plant injury |
|---|---|
| None | — |
| Less than 10 % of small immature fruits | ± |
| 10 % or more of small immature fruits | + |

TABLE 11

| Test compound *) | Concentration (ppm) | Infectious spots per leaf | Plant injury |
|---|---|---|---|
| 3 | 1000 | 7.5 | ± |
| 4 | 1000 | 6.0 | ± |
| 6 | 1000 | 6.9 | ± |
| 8 | 1000 | 8.3 | ± |
| 9 | 1000 | 9.8 | ± |
| 11 | 1000 | 6.3 | ± |
| 13 | 1000 | 7.3 | ± |
| 18 | 1000 | 10.5 | ± |
| 20 | 1000 | 7.8 | — |
| 21 | 1000 | 10.1 | — |
| 23 | 1000 | 8.9 | — |
| 26 | 1000 | 8.4 | — |
| 28 | 1000 | 9.8 | — |
| 30 | 1000 | 7.3 | — |
| 31 | 1000 | 8.1 | — |
| Zinc dimethyldithiocarbamate, 50 % + Bis(dimethyldicarbamoyl)-ethylenediamine, 30 % | 1000 | 11.2 | — |
| Product in Reference Example | 1000 | 29.5 | ± |
| Cupric ethylenebis-(dithiocarbamate) | 1000 | 28.2 | ± |
| cuprous complex salt | 1000 | 20.2 | ± |
| Untreated | — | 38.5 | — |

*) See the remarks under Table 1.

What is claimed is:

1. A process for preparing fungicidally and bactericidally active substances which comprises reacting alkylenebis(dithiocarbamic acid) in a salt form with a water-soluble divalent copper salt in the presence of a halogen ion under the condition that more than one molar amount of divalent copper ion to one molar amount of alkylenebis(dithiocarbamate) salt is present in the reaction system.

2. The process according to claim 1, wherein the reaction is carried out in water, a water-miscible organic solvent or their mixture.

3. The process according to claim 1, wherein the product is recovered from the reaction mixture.

4. The process according to claim 1, wherein the reaction is carried out in the presence of more than 0.1 molar amount of a halogen ion to one molar amount of alkylenebis(dithiocarbamate) salt under the condition that more than 1.1 molar amount of divalent copper ion to one molar amount of alkylenebis(dithiocarbamate) salt is present in the reaction system.

5. The process according to claim 1, wherein the reaction is carried out in the presence of 0.3 to 2.0 molar amount of a halogen ion to one molar amount of alkylenebis(dithiocarbamate) salt under the condition that 1.3 to 3.0 molar amount of divalent copper ion to one molar amount of alkylenebis(dithiocarbamate) salt is present in the reaction system.

6. The process according to claim 1, wherein the reaction is carried out at a temperature from 10° to 100°C.

7. The process according to claim 1, wherein the reaction is carried out with cupric halide.

8. The process according to claim 1, wherein the reaction is carried out with a water-soluble divalent copper salt other than cupric halide in the presence of a halogen ion.

9. The process according to claim 1, wherein the reaction is carried out under an oxidative condition.

10. The process according to claim 9, wherein the reaction is carried out under aeration.

11. The process according to claim 9, wherein the reaction is carried out under an acidic condition.

12. The process according to claim 9, wherein the reaction is carried out in the presence of 0.3 to 2.0 molar amount of a halogen ion to one molar amount of alkylenebis(dithiocarbamate) salt under the condition that 1.3 to 3.0 molar amount of divalent copper ion to one molar amount of alkylenebis(dithiocarbamate) salt is present in the reaction system.

13. The process according to claim 9, wherein the reaction is carried out at a temperature from 10° to 100°C.

14. The process according to claim 1, followed by treatment of the reaction product with an oxidizing agent.

15. The process according to claim 14, wherein the reaction is carried out under an acidic condition.

16. The process according to claim 14, wherein the treatment is carried out at a temperature from 10° to 100°C.

17. An fungicidally and bactericidally active substance having alkylenebis(dithiocarbamate) moiety, divalent copper atom and a halogen atom, these being chemically bonded, in a molar ratio of 1 : X : Y wherein X and Y are respectively satisfying the following relationships: $1 < X \leq 3$ and $0 < Y \leq 2$, which is obtained by reacting alkylenebis(dithiocarbamic acid) in a salt form with a water-soluble divalent copper salt in the presence of more than 0.1 molar amount of a halogen ion to one molar amount of alkylenebis(dithiocarbamate) salt in an aqueous medium at a temperature from 10° to 100°C under the condition that more than 1.1 molar amount of divalent copper ion to one molar amount of alkylenebis(dithiocarbamate) salt is present in the reaction system, and recovering the precipitate from the reaction mixture.

18. A composition for agricultural use containing the fungicidally and bactericidally active substance of claim 17 and an inert carrier.

19. A fungicidally and bactericidally active substance which comprises the oxidation product of the substance according to claim 17.

20. A composition for agricultural use containing the active substance of claim 19 and an inert carrier.

* * * * *